(No Model.)
W. WHITEHEAD & F. W. MAGUIRE.
CLUTCH FOR MACHINERY.
No. 336,273. Patented Feb. 16, 1886.
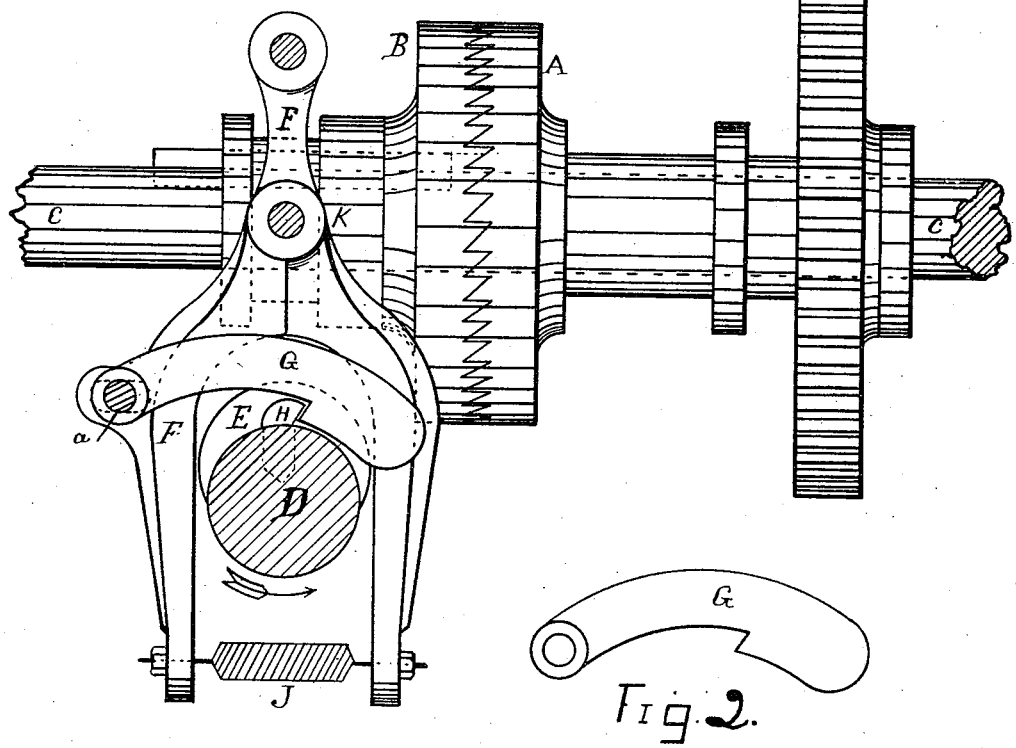
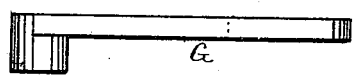
WITNESSES.
Oliver M. Fagley
S. M. Fagley
INVENTORS.
William Whitehead.
Frank W. Maguire.
by John Shinn, Attorney.

UNITED STATES PATENT OFFICE.

WILLIAM WHITEHEAD AND FRANK W. MAGUIRE, OF PHILADELPHIA, PA.

CLUTCH FOR MACHINERY.

SPECIFICATION forming part of Letters Patent No. 336,273, dated February 16, 1886.

Application filed August 24, 1885. Serial No. 175,248. (No model.)

*To all whom it may concern:*

Be it known that we, WILLIAM WHITEHEAD and FRANK W. MAGUIRE, citizens of the United States, residing in Philadelphia, (Germantown,) in the county of Philadelphia and State of Pennsylvania, have invented a certain Improvement in Clutches for Machinery, of which the following is a specification.

Our invention relates to a class of clutches for machinery, which clutches are required to be alternately thrown into and out of gear by some moving part of the machine. The object of our invention is to lock said clutch properly in gear when necessary, and be free to open when desired.

The invention consists in the combination with a sliding clutch-wheel and yoke a locking-arm and retaining cam-catch fixed to the clutch-operating shaft, all as will be hereinafter described, reference being had to the accompanying drawings, making a part of this specification, in which—

Figure 1 is a side view of a toothed clutch mechanism with our improved lock. Fig. 2 is a side and edge view of the locking-arm. Fig. 3 is a view of the cam-catch.

Similar letters refer to similar parts throughout the several views.

Our improvement is more especially adapted to a class of clutches that are used on yarn-spinning machinery known as "self-operating mules," and the clutch is known as the "drawing-out" clutch; but our improvement may be used on other machinery requiring such a clutch.

Fig. 1 shows our improvement attached to a clutch which is old and well known, and it will not be necessary to describe its general construction, but only that part which we claim as our invention and such parts as operate with our improvement.

A is the driver part of the clutch, and B the driven; C, the shaft to which the clutch gives motion.

D is the "cam-shaft" for opening and closing the clutch through the intermediate action of cam E and yoke F.

G is the locking-arm, which is mounted on a stud, *a*, fixed in one of the arms of the yoke F.

H is the retaining-catch, fixed to the shaft D.

The operation is as follows: The clutch is thrown into and out of gear by the shaft D and cam E. The shaft D revolves in direction as indicated by the arrow, and makes one-half of a revolution to throw the clutch out of gear and one-half a revolution to put it into gear. While it is desired to remain in or out of gear, the shaft D remains stationary.

Fig. 1 shows the clutch in gear and the locking-arm G hooked on the retaining-catch H. The shaft D being stationary, the clutch cannot open until the shaft D revolves in direction of the arrow, and the catch H will revolve out of the way and permit it to be opened by the cam E. The next half-revolution will force the clutch into gear and lock it by the arm G, hooking on the catch H, as shown in Fig. 1. The yoke F is jointed at K and held together by the spring J, so that if the teeth of the clutch do not properly "mesh" in gearing, the spring J will give, and the cam E will not break the yoke.

We claim—

The combination of sliding clutch B, yoke F, locking-arm G, mounted on a stud fixed in one of the arms of the yoke F, cam catch H, and shaft D, as shown, described, and for the purpose specified.

WILLIAM WHITEHEAD.
FRANK W. MAGUIRE.

Witnesses:
JOHN SHINN,
WM. F. POTTER.